United States Patent
Tseng et al.

(10) Patent No.: US 9,639,939 B2
(45) Date of Patent: May 2, 2017

(54) APPARATUS AND METHOD FOR VEHICLE POSITIONING

(71) Applicant: Industrial Technology Research Institute, Hsinchu (TW)

(72) Inventors: Yu-Chee Tseng, Hsinchu (TW); Lien-Wu Chen, Taoyuan County (TW); Chia-Chen Chang, Taoyuan County (TW); Yin-Chih Lu, Tainan (TW); Pei-Chuan Tsai, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/334,677

(22) Filed: Jul. 18, 2014

(65) Prior Publication Data

US 2015/0199806 A1 Jul. 16, 2015

(30) Foreign Application Priority Data

Jan. 10, 2014 (TW) .............................. 103100993 A

(51) Int. Cl.
*G06T 7/00* (2006.01)
*G08G 1/01* (2006.01)
(Continued)

(52) U.S. Cl.
CPC ................ *G06T 7/004* (2013.01); *G06T 7/70* (2017.01); *G08G 1/015* (2013.01); *G08G 1/04* (2013.01);
(Continued)

(58) Field of Classification Search
CPC ........... G06T 7/004; G06T 2207/30236; G06T 2207/30256; G08G 1/0125
(Continued)

(56) References Cited

U.S. PATENT DOCUMENTS 6,219,613 B1 * 4/2001 Terrier .................... G01S 13/74
  342/42
6,353,678 B1 * 3/2002 Guo ....................... G06T 7/2086
  382/154

(Continued)

FOREIGN PATENT DOCUMENTS

CN        202650276        1/2013
JP        2012243303       12/2012
(Continued)

OTHER PUBLICATIONS

"Office Action of Taiwan Counterpart Application", issued on Nov. 16, 2015, p. 1-p. 4, in which the listed references were cited.
(Continued)

*Primary Examiner* — Jerrah Edwards
*Assistant Examiner* — Majdi Alsomiri
(74) *Attorney, Agent, or Firm* — Jianq Chyun IP Office

(57) ABSTRACT

A method for vehicle positioning is provided, which includes the steps of identifying at least one vehicle in an image, obtaining identification information of each vehicle from the image, and transforming coordinates of each vehicle in the image into positioning information of the corresponding vehicle according to mapping information. The positioning information is a position of the corresponding vehicle in real world. Precise lane-level vehicle positioning can be achieved based on comparison with the identification information or the positioning information.

28 Claims, 4 Drawing Sheets

(51) Int. Cl.
*G08G 1/015* (2006.01)
*G08G 1/04* (2006.01)
*G06T 7/70* (2017.01)

(52) U.S. Cl.
CPC ............... *G06T 2207/10016* (2013.01); *G06T 2207/30236* (2013.01); *G06T 2207/30256* (2013.01)

(58) Field of Classification Search
USPC ......................................................... 701/454
See application file for complete search history.

(56) References Cited

U.S. PATENT DOCUMENTS

| | | | | |
|---|---|---|---|---|
| 6,546,119 | B2* | 4/2003 | Ciolli | G08G 1/20 382/104 |
| 6,556,916 | B2 | 4/2003 | Waite et al. | |
| 6,950,789 | B2* | 9/2005 | Laird | G07B 15/06 703/8 |
| 7,786,897 | B2 | 8/2010 | Alves | |
| 8,005,615 | B2 | 8/2011 | Okabe | |
| 8,184,863 | B2* | 5/2012 | Wang | G06T 7/20 340/933 |
| 8,521,411 | B2* | 8/2013 | Grabowski | G01C 21/365 701/454 |
| 2002/0140577 | A1* | 10/2002 | Kavner | G07B 15/06 340/933 |
| 2003/0060969 | A1 | 3/2003 | Waite et al. | |
| 2005/0182564 | A1 | 8/2005 | Kim | |
| 2009/0231161 | A1* | 9/2009 | Malarky | G07B 15/063 340/933 |
| 2010/0172543 | A1* | 7/2010 | Winkler | G08G 1/017 382/104 |
| 2011/0024611 | A1 | 2/2011 | Cunningham et al. | |
| 2013/0082874 | A1 | 4/2013 | Zhang | |

FOREIGN PATENT DOCUMENTS

| | | |
|---|---|---|
| TW | 200844401 | 11/2008 |
| TW | 201024784 | 7/2010 |

OTHER PUBLICATIONS

Yu-Tsen Hsieh, "Reference-Station-Free Calibration Method for Global Positioning Systems using Cooperative Vehicles," Master's Thesis, National Tsing Hua University Department of Computer Science, Jun. 2012.

Andy An-Kai Jeng, et al., "VIP: Video-assisted Inter-vehicle Positioning System," 2012 12th International Conference on ITS Telecommunications (ITST), Nov. 2012, pp. 522-pp. 526.

Taro Suzuki, et al, "High-Accuracy GPS and GLONASS Positioning by Multipath Mitigation using Omnidirectional Infrared Camera," 2011 IEEE International Conference on Robotics and Automation (ICRA), May 2011, pp. 311-pp. 316.

M Febrian Rachmadi, "Adaptive Traffic Signal Control System Using Camera Sensor and Embedded System," TENCON 2011—2011 IEEE Region 10 Conference, Nov. 2011, pp. 1261-pp. 1265.

Ramsin Khoshabeh, et al., "Multi-camera Based Traffic Flow Characterization & Classification," Intelligent Transportation Systems Conference, 2007 (ITSC 2007) IEEE, Oct 2007, pp. 259-pp. 264.

Anh Vu, et al., "Real-Time Computer Vision/DGPS-Aided Inertial Navigation System for Lane-Level Vehicle Navigation," IEEE Transactions on Intelligent Transportation Systems, vol. 13, No. 2, Jun. 2012, pp. 899-pp. 913.

Nima Alam, et al., "An Instantaneous Lane-Level Positioning Using DSRC Carrier Frequency Offset," IEEE Transactions on Intelligent Transportation Systems, vol. 13, No. 4, Dec. 2012, pp. 1566-pp. 1575.

* cited by examiner

APPARATUS AND METHOD FOR VEHICLE POSITIONING

CROSS-REFERENCE TO RELATED APPLICATION

This application claims the priority benefit of Taiwan application serial no. 103100993, filed on Jan. 10, 2014. The entirety of the above-mentioned patent application is hereby incorporated by reference herein and made a part of this specification.

BACKGROUND

Technical Field

The disclosure relates to an apparatus and a method for vehicle positioning.

Description of Related Art

Most of modern cities are provided with complex roads including urban roads and elevated roads. However, car satellite navigation systems nowadays are incapable of providing positioning information in lane-level. Therefore, while driving on said complex roads, navigation may be incorrect because sometimes the navigation system may not be able to tell which lane a vehicle is currently driven on.

In addition, as popularity of the car satellite navigation systems grows, developments in informatization, intelligentization and applicable diversification regarding the same are also remarkable urgent. Accordingly, an agenda is provided in which all vehicles driven on the same road are integrated, such that when the vehicle at the front breaks, a warning message may be instantly received by the vehicle at the back on the same lane. Or, in case a vehicle accident occurs, the vehicle accident or the vehicle passed by may be actively notified to the vehicles at the back. More precise positioning information is required in order to realize said agenda. In other words, the positioning information in lane-level is required.

SUMMARY

The disclosure is directed to a vehicle positioning apparatus and a method for vehicle positioning, capable of achieving a precise lane-level vehicle positioning through an image captured by a camera and an image identification process.

A vehicle positioning apparatus of the disclosure includes a storage unit and a processing unit. The storage unit stores an image and mapping information. The processing unit is coupled to the storage unit, identifying at least one vehicle in the image, obtaining the identification information of each vehicle from the image, and transforming image coordinates of each of the vehicles into positioning information according to the mapping information. The image coordinates are coordinates of the corresponding vehicle in the image. The positioning information is a position of the corresponding vehicle in real world.

Another vehicle positioning apparatus of the disclosure includes a storage unit and a processing unit. The storage unit stores identification information and positioning information of at least one first vehicle. The processing unit is coupled to the storage unit, determining that one of the first vehicles and a second vehicle are the same vehicle according to the identification information and the positioning information of each of the first vehicles, and obtaining positioning information of the second vehicle based on the positioning information of the determined first vehicle. The positioning information is a position of the corresponding first vehicle or the second vehicle in real world.

A method for vehicle positioning of the disclosure includes the steps of identifying at least one vehicle in an image, obtaining identification information of each vehicle from the image, and transforming image coordinates of each vehicle into the positioning information according to the mapping information. The image coordinates are coordinates of the corresponding vehicle in the image. The positioning information is a position of the corresponding vehicle in real world.

Another method for vehicle positioning of the disclosure includes the steps of according to identification information and positioning information of at least one first vehicle, determining that one of the first vehicles and a second vehicle are the same vehicle; and obtaining positioning information of the second vehicle based on the positioning information of the determined first vehicle. The positioning information is a position of the corresponding first vehicle or the second vehicle in real world.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
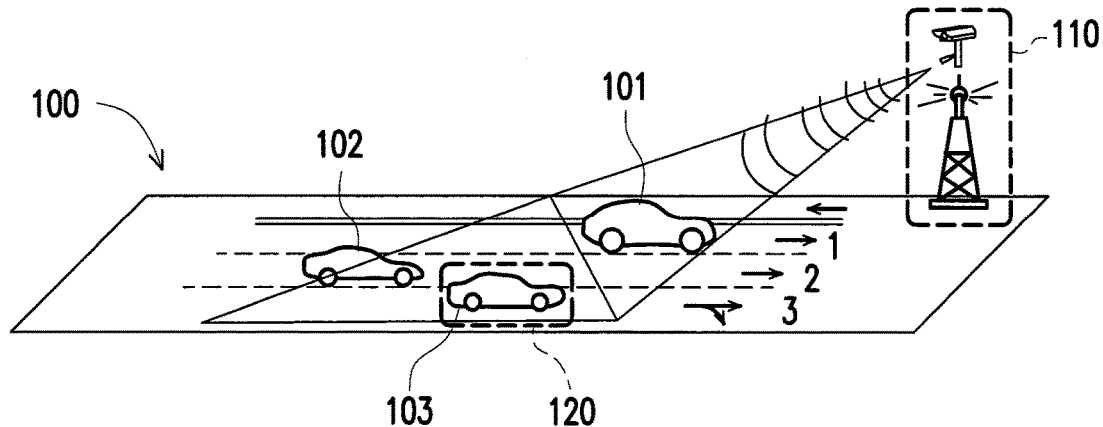
FIG. 1 is a schematic diagram of two vehicle positioning apparatuses according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
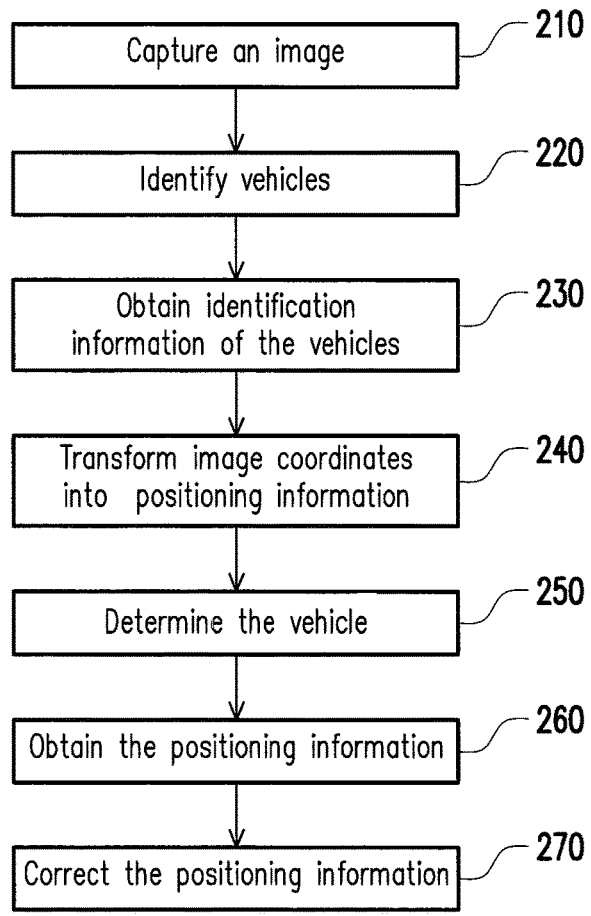
FIG. 2 is a flowchart of a method for vehicle positioning according to an embodiment of the disclosure.

FIG. 1 is a schematic diagram of a camera 110 and a vehicle positioning apparatus 120 according to an embodiment of the disclosure. As shown in FIG. 1, three vehicles 101 to 103 are driving on a road 100. The camera 110 is mounted next to or above the road 100, and capable of continuously capturing images of the road 100. The camera 110 may also be referred to as a vehicle positioning apparatus 120. The vehicle 103 equips the vehicle positioning apparatus 120. The vehicle positioning apparatus 120 may be an apparatus directly mounted on the vehicle 103, or a mobile apparatus that can be easily carried by a driver or a passenger of the vehicle 103. The camera 110 and the vehicle positioning apparatus 120 may execute a method for vehicle positioning as shown in FIG. 2 together through a wireless communication. In brief, said method is to process the image of the road 100, and to obtain identification information and positioning information of each vehicle from the image, so that precise vehicle positioning may be achieved according to said information.

Figure 6:
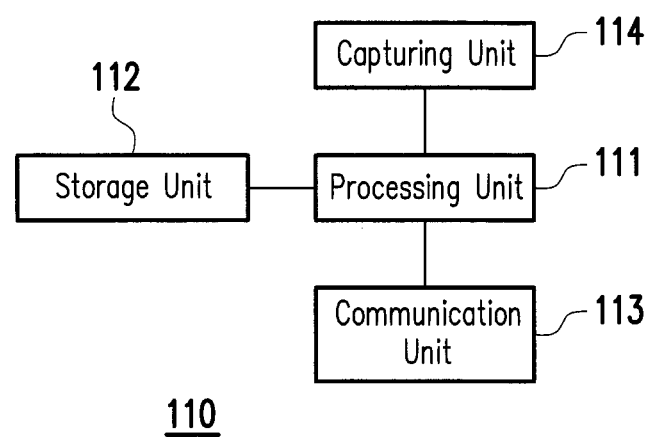
FIG. 6 is a schematic diagram of a vehicle positioning apparatus according to an embodiment of the disclosure.

FIG. 6 is a schematic diagram of the camera 110 according to an embodiment of the disclosure. The camera 110 includes a processing unit 111, a storage unit 112, a communication unit 113 and a capturing unit 114. Therein, the processing unit 111 is coupled to the storage unit 112, the communication unit 113 and the capturing unit 114. Each of the units depicted in FIG. 6 is a hardware unit.

Figure 7:
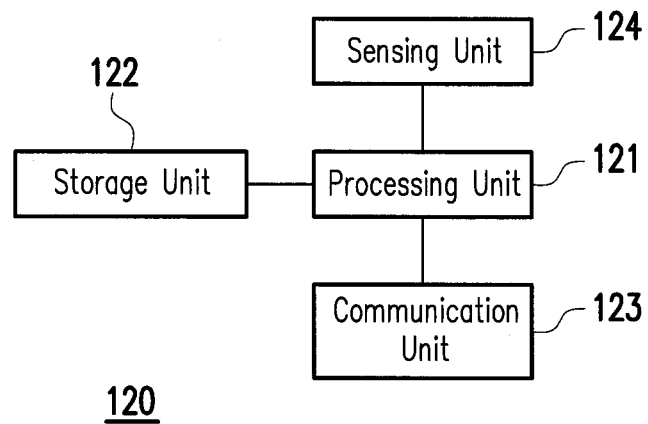
FIG. 7 is a schematic diagram of a vehicle positioning apparatus according to another embodiment of the disclosure.

FIG. 7 is a schematic diagram of the vehicle positioning apparatus 120 according to an embodiment of the disclosure. The vehicle positioning apparatus 120 includes a processing unit 121, a storage unit 122, a communication unit 123 and a sensing unit 124. Therein, the processing unit 121 is coupled to the storage unit 122, the communication unit 123 and the sensing unit 124. Each of the units depicted in FIG. 7 is a hardware unit.

Figure 3:
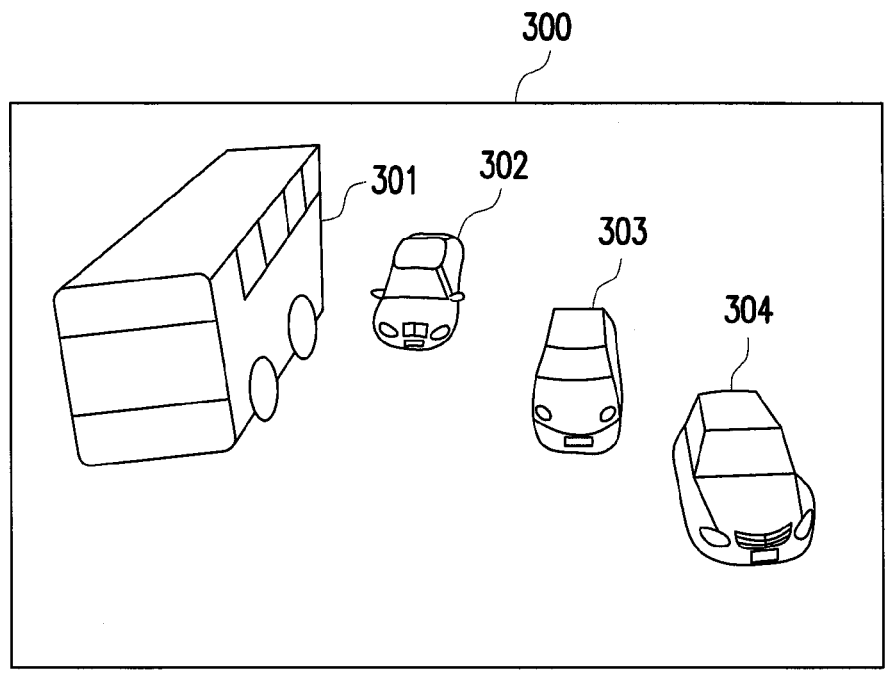
FIG. 3 is a schematic diagram of one step in a method for vehicle positioning according to an embodiment of the disclosure.

Processes of the method of FIG. 2 are described as follows. In step 210, the capturing unit 114 of the camera 110 captures an image of the road 100, and the image may include one or more vehicles. The processing unit 111 of the camera 110 may identify the one or more vehicles in step 220. For example, FIG. 3 illustrates four vehicles 301 to 304 identified by the processing unit 111 from an image 300. The identification in step 220 eliminates irrelevant backgrounds in the image such as road surfaces, buildings, trees, passerby next to the road. The processing unit 111 of the camera 110 is capable of obtaining image coordinates of each vehicle in the image through the identification of the vehicles in step 220. The so-called image coordinates are coordinates of the corresponding vehicle in the image.

The processing unit 111 of the camera 110 obtains the identification information of each vehicle in the image from the image in step 230. For instance, the identification information may include one or more features such as a plate number, a vehicle type and a color of the corresponding vehicle. The vehicle type may be one of various vehicle types including a personal vehicle, a goods vehicle or a trailer. The color may be defined by using coordinates in color space such as RGB, HSV or YCbCr.

The processing unit 111 of the camera 110 transforms the image coordinates of each vehicle in the image into the positioning information of the vehicle according to predetermined mapping information in step 240. For instance, the image may be divided into a plurality of regions in which each of the regions may include one or more pixels of the image. The mapping information includes a position of each region of the image in real world. Because a field of view captured by the camera 110 is fixed, latitude and longitude coordinates of each region in the field of view captured by the camera 110 may be measured through a global positioning system (GPS) in advance, and such latitude and longitude coordinates may be used to mark a position of each region of the image in real world. Or, a lane number and a milestone of the road 100 may be directly used to mark the position of each region in real world. For example, as shown in FIG. 1, the lane numbers where vehicles 101 to 103 are located are 1 to 3, respectively.

In step 240, the processing unit 111 of the camera 110 may associate the image coordinates of each vehicle with one of said regions, and set the position of the associated region in real world as the positioning information of the associated vehicle. As a result, the positioning information of each vehicle in the image is corresponding to the position of the vehicle in real world. The positioning information may include the latitude and longitude coordinates of the corresponding vehicle in real world, or the lane number and the milestone of the road where the corresponding vehicle is located. Because the region of the image may be finely divided in the lane-level, the positioning information of the vehicle obtained according to the regions may also be as precise as in the lane-level.

The storage unit 112 of the camera 110 is capable of storing the image captured by the capturing unit 114, the image coordinates, the identification information and the positioning information of each vehicle in the image, and said mapping information. Next, steps 250 to 270 are executed by the vehicle positioning apparatus 120. Therefore, in between steps 240 and 250, the communication unit 113 of the camera 110 wirelessly broadcasts the identification information and the positioning information of each vehicle in the image. The communication unit 123 of the vehicle positioning apparatus 120 may wirelessly receive the identification information and the positioning information of each vehicle in the image, and said information may be stored in the storage unit 122 of the vehicle positioning apparatus 120.

Subsequently, the processing unit 121 of the vehicle positioning apparatus 120 determines whether one of the vehicles and the vehicle equipping the vehicle positioning apparatus 120 are the same vehicle in step 250 (details thereof will be describe later). The processing unit 121 of the vehicle positioning apparatus 120 may obtain the positioning information of the vehicle equipping the vehicle positioning apparatus 120 in step 260 according to a result from said determination. For instance, the processing unit 121 may set the positioning information of the determined vehicle to the positioning information of the vehicle equipping the vehicle positioning apparatus 120. Accordingly, which lane is the vehicle equipping the vehicle positioning apparatus 120 located may be obtained, thereby providing a precise navigation.

Or, in step 270, the processing unit 121 may further correct the positioning information of the determined vehicle in step 250, so as to obtain more precise positioning information. In this regard, the communication unit 113 of the camera 110 may wirelessly broadcast a timestamp, and the timestamp is a capturing time of the image. The communication unit 123 of the vehicle positioning apparatus 120 wirelessly obtains the timestamp from the camera 110. Then, the processing unit 121 of the vehicle positioning apparatus 120 corrects the positioning information of the determined vehicle in step 250 according to a forward speed and a forward direction of the vehicle equipping the vehicle positioning apparatus 120, and a time difference between a current time and the timestamp, and sets the positioning information of the vehicle equipping the vehicle positioning apparatus 120 to the corrected positioning information. For instance, the processing unit 121 may utilize the forward speed, the forward direction and the time difference to calculate a displacement of the vehicle equipping the vehicle positioning apparatus 120 during a period of the time difference, and the corrected positioning information may be obtained by add the displacement on the position indicated in the positioning information of the determined vehicle in step 250. The forward speed and the forward direction of the vehicle equipping the vehicle positioning apparatus 120 may come from a traditional global positioning system. In some applications, the correction in step 270 is not required, such that step 270 may then be omitted.

Figure 4:
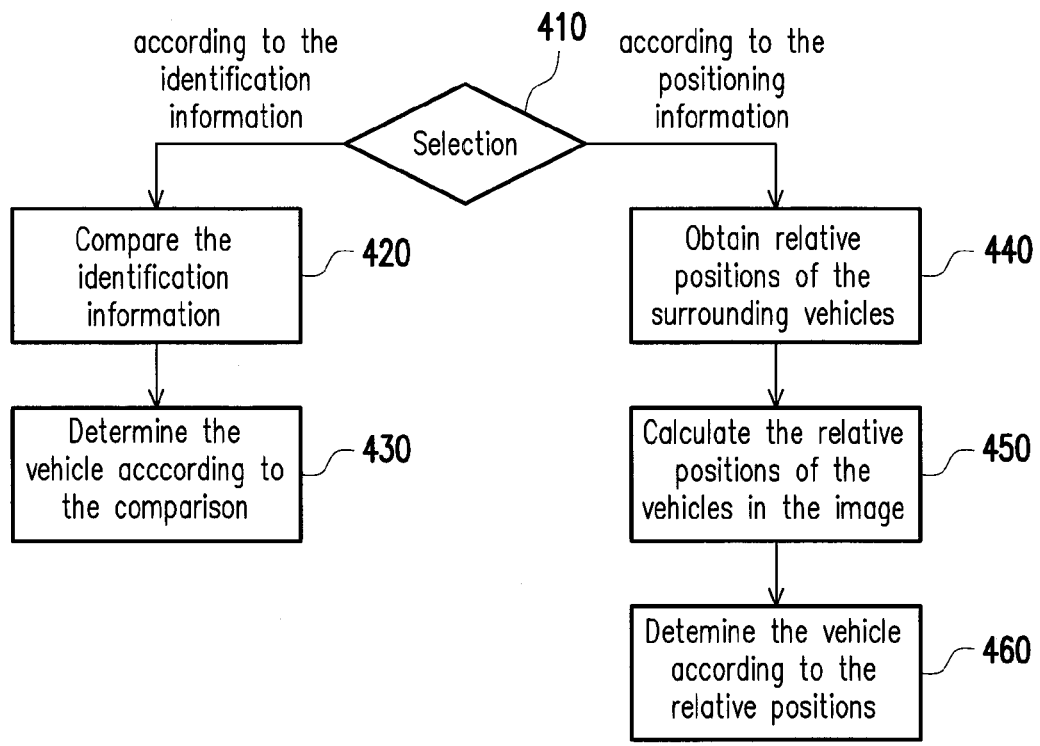
FIG. 4 is a flowchart of a method for vehicle positioning according to an embodiment of the disclosure.

FIG. 4 is a flowchart of step 250 in details according to an embodiment of the disclosure. First, the processing unit 121 of the vehicle positioning apparatus 120 selects one of the identification information or the positioning information of each vehicle in the image to execute the determination of the vehicle in step 250. When the processing unit 121 is decided to execute the determination according to the identification information, the processing unit 121 compares the identification information of each vehicle with the identification information of the vehicle equipping the vehicle positioning apparatus 120 in step 420, and then the processing unit 121 may execute the determination of the vehicle in step 430 based on said comparison.

More specifically, when the identification information of only one vehicle among the vehicles in the image is identical to the identification information of the vehicle equipping the vehicle positioning apparatus 120, the processing unit 121 of the vehicle positioning apparatus 120 may determine that the only one vehicle and the vehicle equipping the vehicle positioning apparatus 120 are the same vehicle.

TABLE 1

|  | Identification Information | | | Positioning |
| --- | --- | --- | --- | --- |
|  | Plate Number | Vehicle Type | Color | Information |
| Image of Vehicle 1 | 456-AB | Bus | Red | $(A_1, B_1)$ |
| Image of Vehicle 2 | 4465-YM | Personal Vehicle | Gray | $(A_2, B_2)$ |
| Image of Vehicle 3 | 656-LS | Bus | Gray | $(A_3, B_3)$ |
| Image of Vehicle 4 | 1317-CG | Personal Vehicle | White | $(A_4, B_4)$ |

Table 1 lists the identification information and the positioning information of each vehicle in the image broadcasted by the camera 110 according to one specific embodiment, in which all of $A_1$ to $A_4$ and $B_1$ to $B_4$ are the latitude and longitude coordinates. The image according to the present embodiment includes four vehicles. Assuming that the identification information of the vehicle equipping the vehicle positioning apparatus 120 is of "Plate Number: 656-LS; Vehicle Type: Bus; Color: Gray", since only the identification information of the vehicle 3 is identical to that of the vehicle equipping the vehicle positioning apparatus 120, the processing unit 121 may determine that the vehicle 3 and the vehicle equipping the vehicle positioning apparatus 120 are the same vehicle, and set the positioning information of vehicle equipping the vehicle positioning apparatus 120 to the positioning information of the vehicle 3 ($A_3$, $B_3$).

Alternatively, when a part of the identification information of only one vehicle among the vehicles in the image is identical to a corresponding part of the identification information of the vehicle equipping the vehicle positioning apparatus 120, the processing unit 121 of the vehicle positioning apparatus 120 may determine that the only one vehicle and the vehicle equipping the vehicle positioning apparatus 120 are the same vehicle. For instance, assuming that the identification information of the vehicle quipping the vehicle positioning apparatus 120 is of "Plate Number: 1317-CG; Vehicle Type: Personal Vehicle; Color: White", the processing unit 121 may then determine the vehicle according to said plate number or said color. In Table 1, only the plate number of the vehicle 4 is identical to that of the vehicle equipping the vehicle positioning apparatus 120, and only the color of the vehicle 4 is identical to that of the vehicle equipping the vehicle positioning apparatus 120. Therefore, the processing unit 121 may then determine that the vehicle 4 and the vehicle equipping the vehicle positioning apparatus 120 are the same vehicle.

Sometimes, some or all of the features in the identification information cannot be identified due to reasons like dark sky, heavy rain, fog, lens of the camera being blocked by the vehicle at the front or being too dirty. In this case, the processing unit 111 of the camera 110 may set the features of the vehicle in the broadcasted information that cannot be identified to "unknown". For instance, in comparison of one specific feature between the identification information of one specific vehicle (A) in the image and the vehicle (B) equipping the vehicle positioning apparatus 120, as long as the specific feature of the vehicle A or the vehicle B is unknown, or the specific features of the vehicle A and the vehicle B are both unknown, the processing unit 121 of the vehicle positioning apparatus 120 may determine that the specific features of the vehicle A and the vehicle B are different. For instance, one unknown plate number will not be determined as the same to any known plate number, and two unknown plate numbers will not be determined as the same, either. In case the processing unit 121 cannot determine the vehicle according to the identification information due to the unknown features, the processing unit 121 may determine the vehicle according to the positioning information (i.e., by executing steps 440 to 460). Moreover, the processing unit 121 may also directly execute steps 440 to 460 without checking whether the vehicle may be determined according to the identification information.

Figure 5:
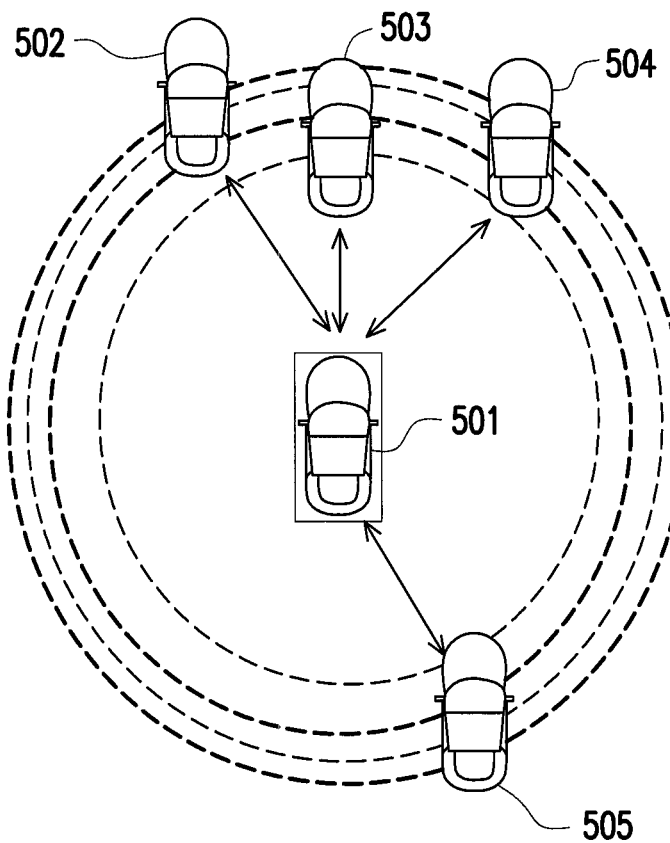
FIG. 5 is a schematic diagram of one step in a method for vehicle positioning according to an embodiment of the disclosure.

In step 440, the sensing unit 124 of the vehicle positioning apparatus 120 may obtain a relative position of one or more vehicles surrounding the vehicle equipping the vehicle positioning apparatus 120 in relative to the respective vehicle equipping the vehicle positioning apparatus 120. For instance, the sensing unit 124 may be a small radar, and the sensing unit 124 is capable of sensing a relative distance and a relative angle of each surrounding vehicle. Said relative distance and said relative angle are the relative position of the surrounding vehicles. For instance, FIG. 5 illustrates the relative positions of four vehicles 502 to 505 surrounding a vehicle 501 equipping the vehicle positioning apparatus 120 sensed by the sensing unit 124 in one specific embodiment.

In step 450, for each of vehicles in the image, the processing unit 121 of the vehicle positioning apparatus 120 calculates the relative positions of the rest of vehicles in the image in relative to the vehicle. For instance, in case the image captured by the camera 110 includes five vehicles $V_1$ to $V_5$, the processing unit 121 of the vehicle positioning apparatus 120 may calculate the relative positions of the vehicles $V_2$, $V_3$, $V_4$ and $V_5$ in relative to the vehicle $V_1$; calculate the relative positions of the vehicles $V_1$, $V_3$, $V_4$ and $V_5$ in relative to the vehicle $V_2$; calculate the relative positions of the vehicles $V_1$, $V_2$, $V_4$ and $V_5$ in relative to the vehicle $V_3$; calculate the relative positions of the vehicles $V_1$, $V_2$, $V_3$ and $V_5$ in relative to the vehicle $V_4$; and calculate the relative positions of the vehicles $V_1$, $V_2$, $V_3$ and $V_4$ in relative to the vehicle $V_5$, in that sequence. Because the positioning information is capable of indicating the position of the corresponding vehicle in real world, the processing unit 121 may calculate the relative positions in between the vehicles $V_1$ to $V_5$ according to the positioning information of the vehicles $V_1$ to $V_5$.

In step 460, the processing unit 121 of the vehicle positioning apparatus 120 may locate, from among the vehicles in the image, the one that makes the relative positions of the rest of the vehicles most matching to the relative positions of the surrounding vehicles sensed by the sensing unit 124, and determine that the located vehicle and the vehicle equipping the vehicle positioning apparatus 120 are the same vehicle. For instance, when the vehicles 501 to 505 of FIG. 5 are captured by the camera 110 and from among the vehicles $V_1$ to $V_5$ in the image, the relative positions of the rest of vehicles in relative to the vehicle $V_4$ are most matching to the relative positions of the vehicles in FIG. 5, the processing unit 121 of the vehicle positioning apparatus 120 may determine that the vehicle $V_4$ and the vehicle 501 equipping the vehicle positioning apparatus 120 are the same vehicle.

In an embodiment, the processing unit 121 may simply execute said determination according to the identification information of the vehicles in the image, thus the sensing unit 124 may be omitted in that embodiment.

In the foregoing embodiments, steps 210 to 240 of FIG. 2 are executed by the camera 110, and steps 250 to 270 are executed by the vehicle positioning apparatus 120. In another embodiment, steps 210 to 220 of FIG. 2 may be executed by the camera 110, and steps 230 to 270 may be executed by the vehicle positioning apparatus 120. In the present embodiment, the storage unit 112 of the camera 110 is capable of storing the image captured by the capturing unit 114, the image coordinates of each vehicle in the image, and said mapping information. In between steps 220 and 230, the communication unit 113 of the camera 110 wirelessly broadcasts the image, the image coordinates of each vehicle in the image, and the mapping information. The communication unit 123 of the vehicle positioning apparatus 120 wirelessly receives the image, the image coordinates and the mapping information, and said data and information may be stored in the storage unit 122 of the vehicle positioning apparatus 120. In addition, the storage unit 122 may also store the identification information generated in step 230 and the positioning information generated in step 240. Details regarding steps 230 and 240 executed by the vehicle positioning apparatus 120 are identical to that in the foregoing embodiments, thus related description is omitted hereinafter.

In another embodiment, step 210 of FIG. 2 may be executed by the camera 110, and steps 220 to 270 may be executed by the vehicle positioning apparatus 120. In the present embodiment, the storage unit 112 of the camera 110 is capable of storing the image captured by the capturing unit 114. In between steps 210 and 220, the communication unit 113 of the camera 110 wirelessly broadcasts the image and the mapping information. The communication unit 123 of the vehicle positioning apparatus 120 wirelessly receives the image and the mapping information, and said image and the mapping information may be stored in the storage unit 122 of the vehicle positioning apparatus 120. In addition, the storage unit 122 may also store the image coordinates generated in step 220, the identification information generated in step 230 and the positioning information generated in step 240. Details regarding steps 220, 230 and 240 executed by the vehicle positioning apparatus 120 are identical to that in the foregoing embodiments, thus related description is omitted hereinafter.

Figure 8:
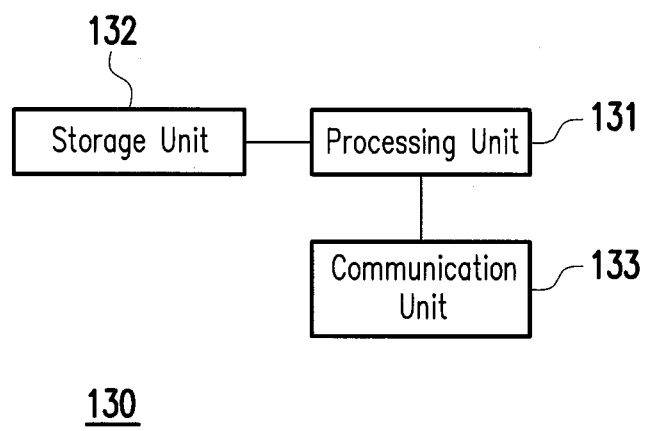
FIG. 8 is a schematic diagram of a vehicle positioning apparatus according to another embodiment of the disclosure.

In another embodiment, step 210 of FIG. 2 may be executed by the camera 110, steps 220 to 240 may be executed by a cloud server 130 depicted in FIG. 8, and steps 250 to 270 may be executed by the vehicle positioning apparatus 120. The cloud server 130 includes a processing unit 131, a storage unit 132, and a communication unit 133. The processing unit 131 is coupled between the storage unit 132 and the communication unit 133. Each of the units depicted in FIG. 8 is a hardware unit. The cloud server 130 may also be referred to as a vehicle positioning apparatus 120.

In the present embodiment, the storage unit 112 of the camera 110 is capable of storing the image captured by the capturing unit 114 and the mapping information. In between steps 210 and 220, the communication unit 113 of the camera 110 wirelessly broadcasts the image and the mapping information. The communication unit 133 of the cloud server 130 wirelessly receives the image and the mapping information, and the image and the mapping information may be stored in the storage unit 132 of the cloud sever 130. In addition, the storage unit 132 may also store the image coordinates generated in step 220, the identification information generated in step 230 and the positioning information generated in step 240. Details regarding steps 220 and 240 executed by the cloud server 130 are identical to that in the foregoing embodiments, thus related description is omitted hereinafter.

In between steps 240 and 250, the communication unit 133 of the cloud server 130 sends the identification information and the positioning information to the camera 110. The communication unit 113 of the camera 110 receives the identification information and the positioning information. Then, the communication unit 113 of the camera 110 wirelessly broadcasts the identification information and the positioning information. The communication unit 123 of the vehicle positioning apparatus 120 wirelessly receives the identification information and the positioning information, and said information may be stored in the storage unit 122 of the vehicle positioning apparatus 120.

In summary, the disclosure utilizes the camera to continuously capture the image, so that the vehicle positioning apparatus on the vehicle may obtain the positioning information of that vehicle through image identification process, transformation from the image coordinates into the positioning information, and comparison with the identification information of the vehicles. As a result, precise lane-level vehicle positioning can be achieved for facilitating in various applications.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A vehicle positioning apparatus, comprising:
a storage unit storing an image and a mapping information; and
a processing unit, coupled to the storage unit, identifying at least one first vehicle in the image, obtaining identification information of each of the first vehicles from the image, and transforming image coordinates of each of the first vehicles into positioning information according to the mapping information, wherein the image coordinates are coordinates of a corresponding first vehicle in the image, and the positioning information is a position of the corresponding first vehicle in real world, wherein the position information comprises a lane number and a milestone of a road where the corresponding first vehicle is located, the vehicle positioning apparatus communicates with another vehicle positioning apparatus having a processing unit, and the another vehicle positioning apparatus comprises:

a sensing unit, coupled to the processing unit of the another vehicle positioning apparatus, obtaining a relative position of at least one third vehicle surrounding a second vehicle in relative to the second vehicle, wherein for each of the first vehicles the processing unit of the another vehicle positioning apparatus calculates relative positions of the rest of the first vehicles in relative to the first vehicle, according to the positioning information of the first vehicles, and locates the first vehicle that makes the relative positions of the rest of the first vehicles most matching to the relative position of the third vehicles, and determines that the located first vehicle and the second vehicle are the same vehicle.

2. The vehicle positioning apparatus of claim 1, wherein the identification information at least comprises one of a plate number, a vehicle type and a color of the corresponding first vehicle.

3. The vehicle positioning apparatus of claim 1, wherein the image is divided into a plurality of regions, each of the regions comprises at least one pixel of the image, the mapping information comprises a position of each of the regions in real world, and the processing unit associates the image coordinates of each of the first vehicles with one of the regions and sets the position of the associated region as the positioning information of the associated first vehicle.

4. The vehicle positioning apparatus of claim 1, wherein the positioning information further comprises latitude and longitude coordinates of the corresponding first vehicle in real world.

5. The vehicle positioning apparatus of claim 1, further comprising:

a communication unit, coupled to the processing unit, receiving the image and the mapping information, and sending out the identification information and the positioning information of each of the first vehicles.

6. The vehicle positioning apparatus of claim 1, further comprising:

a capturing unit, coupled to the processing unit, and capturing the image; and a communication unit, coupled to the processing unit, and wirelessly broadcasting the identification information and the positioning information of each of the first vehicles.

7. The vehicle positioning apparatus of claim 6, wherein the communication unit further wirelessly broadcasts a timestamp, and the timestamp is a capturing time of the image.

8. A vehicle positioning apparatus, comprising:

a storage unit, storing an identification information and a positioning information of at least one first vehicle;

a processing unit, coupled to the storage unit, determining that one of the first vehicles and a second vehicle are the same vehicle according to the identification information and the positioning information of each of the first vehicles, and obtaining positioning information of the second vehicle based on the positioning information of the determined first vehicle, wherein the positioning information is a position of a corresponding first vehicle or the second vehicle in real world; and a sensing unit, coupled to the processing unit, and obtaining a relative position of at least one third vehicle surrounding the second vehicle in relative to the second vehicle, wherein for each of the first vehicles the processing unit calculates relative positions of the rest of the first vehicles in relative to the first vehicle, according to the positioning information of the first vehicles, and locates the first vehicle that makes the relative positions of the rest of the first vehicles most matching to the relative position of the third vehicles, and determines that the located first vehicle and the second vehicle are the same vehicle, wherein the position information comprises a lane number and a milestone of a road where the corresponding first vehicle is located.

9. The vehicle positioning apparatus of claim 8, wherein the identification information at least comprises one of a plate number, a vehicle type and a color of the corresponding first vehicle.

10. The vehicle positioning apparatus of claim 8, wherein the positioning information further comprises latitude and longitude coordinates of the corresponding first vehicle or the second vehicle in real world.

11. The vehicle positioning apparatus of claim 8, further comprising:

a communication unit, coupled to the processing unit, and receiving an image, image coordinates of each of the first vehicles, and a mapping information, wherein the age coordinates are coordinates of the corresponding first vehicle in the image, and the processing unit obtains the identification information of each of the first vehicles from the image and transforms the image coordinates of each of the first vehicles into the positioning information of the corresponding first vehicle according to the mapping information.

12. The vehicle positioning apparatus of claim 11, wherein the image is divided into a plurality of regions, each of the regions comprises at least one pixel of the image, the mapping information comprises a position of each of the regions in real world, and the processing unit associates the image coordinates of each of the first vehicles with one of the regions and sets the position of the associated region as the positioning information of the associated first vehicle.

13. The vehicle positioning apparatus of claim 8, further comprising:

a communication unit, coupled to the processing unit, and receiving an image and a mapping information, wherein the processing unit identifies the first vehicles in the image, obtains the identification information of each of the first vehicles from the image and transforms image coordinates of each of the first vehicles into the positioning information of the corresponding first vehicle according to the mapping information, wherein the image coordinates are coordinates of the corresponding first vehicle in the image.

14. The vehicle positioning apparatus of claim 8, further comprising:

a communication unit, coupled to the processing unit, and obtaining a timestamp, wherein the timestamp is a capturing time of the image, and the processing unit corrects the positioning information of the determined first vehicle according to a forward speed and a forward direction of the second vehicle and a time difference between a current time and the timestamp, and sets the positioning information of the second vehicle to the corrected positioning information.

15. A method for vehicle positioning adopted by a vehicle positioning apparatus having a processing unit, the processing unit implementing the method comprising:
    identifying at least one first vehicle in an image;
    obtaining an identification information of each of the first vehicles from the image; and
    transforming image coordinates of each of the first vehicles into positioning information according to a mapping information, wherein the image coordinates are coordinates of a corresponding first vehicle in the image, and the positioning information is a position of the corresponding first vehicle in real world,
    wherein the position information comprises a lane number and a milestone of a road where the corresponding first vehicle is located, the vehicle positioning apparatus communicates with another vehicle positioning apparatus having a processing unit, the processing unit of the another vehicle positioning apparatus implements the method comprising:
        obtaining a relative position of at least one third vehicle surrounding a second vehicle in relative to the second vehicle;
        for each of the first vehicles, calculating relative positions of the rest of the first vehicles in relative to the first vehicle, according to the positioning information of the first vehicles; and
        locating the first vehicle that makes the relative positions of the rest of the first vehicles most matching to the relative position of the third vehicles, and determining that the located first vehicle and the second vehicle are the same vehicle.

16. The method for vehicle positioning of claim 15, wherein the identification information at least comprises one of a plate number, a vehicle type and a color of the corresponding first vehicle.

17. The method for vehicle positioning of claim 15, wherein the image is divided into a plurality of regions, each of the regions comprises at least one pixel of the image, the mapping information comprises a position of each of the regions in real world, and the step of transforming the image coordinates of each of the first vehicles into the positioning information comprises:
    associating the image coordinates of each of the first vehicles with one of the regions; and
    setting the position of the associated region as the positioning information of the associated first vehicle.

18. The method for vehicle positioning of claim 15, wherein the positioning information further comprises latitude and longitude coordinates of the corresponding first vehicle in real world.

19. The method for vehicle positioning of claim 15, further comprising:
    receiving the image and the mapping information; and
    sending out the identification information and the positioning information of each of the first vehicles.

20. The method for vehicle positioning of claim 15, further comprising:
    capturing the image; and
    wirelessly broadcasting the identification information and the positioning information of each of the first vehicles.

21. The method for vehicle positioning of claim 20, further comprising:
    wirelessly broadcasting a timestamp, wherein the timestamp is a capturing time of the image.

22. A method for vehicle positioning adopted by a vehicle positioning apparatus having a processing unit, the processing unit implementing the method comprising:
    according to identification information and positioning information of at least one first vehicle, determining that one of the first vehicles and a second vehicle are the same vehicle; and
    obtaining positioning information of the second vehicle based on the positioning information of the determined first vehicle, wherein the positioning information is a position of a corresponding first vehicle or the second vehicle in real world,
    wherein the position information comprises a lane number and a milestone of a road where the corresponding first vehicle is located,
    wherein the step of determining that one of the first vehicles and the second vehicle are the same vehicle comprises:
        obtaining a relative position of at least one third vehicle surrounding the second vehicle in relative to the second vehicle;
        for each of the first vehicles, calculating relative positions of the rest of the first vehicles in relative to the first vehicle, according to the positioning information of the first vehicles; and
        locating the first vehicle that makes the relative positions of the rest of the first vehicles most matching to the relative position of the third vehicles, and determining that the located first vehicle and the second vehicle are the same vehicle.

23. The method for vehicle positioning of claim 22, wherein the identification information at least comprises one of a plate number, a vehicle type and a color of the corresponding first vehicle.

24. The method for vehicle positioning of claim 22, wherein the positioning information further comprises latitude and longitude coordinates of the corresponding first vehicle or the second vehicle in real world.

25. The method for vehicle positioning of claim 22, further comprising:
    receiving an image, image coordinates of each of the first vehicles, and mapping information, wherein the image coordinates are coordinates of the corresponding first vehicle in the image;
    obtaining the identification information of each of the first vehicles from the image; and
    transforming the image coordinates of each of the first vehicles into the positioning information according to the mapping information.

26. The method for vehicle positioning of claim 25, wherein the image is divided into a plurality of regions, each of the regions comprises at least one pixel of the image, the mapping information comprises a position of each of the regions in real world, and the step of transforming the image coordinates of each of the first vehicles into the positioning information comprises:
    associating the image coordinates of each of the first vehicles with one of the regions; and
    setting the position of the associated region as the positioning information of the associated first vehicle.

27. The method for vehicle positioning of claim 22, further comprising:
    receiving an image and mapping information;
    identifying the first vehicles in the image;
    obtaining the identification information of each of the first vehicles from the image; and
    transforming image coordinates of each of the first vehicles into the positioning information of the corresponding first vehicle according to the mapping information, wherein the image coordinates are coordinates of the corresponding first vehicle in the image.

28. The method for vehicle positioning of claim 22, further comprising:
providing a forward speed and a forward direction of the second vehicle;
obtaining a timestamp, wherein the timestamp is a capturing time of the image;
correcting the positioning information of the determined first vehicle according to the forward speed and the forward direction of the second vehicle and a time difference between a current time and the timestamp; and
setting the positioning information of the second vehicle to the corrected positioning information.

* * * * *